(12) United States Patent
Al-Garni et al.

(10) Patent No.: US 7,857,945 B2
(45) Date of Patent: Dec. 28, 2010

(54) DOUBLE ACTION SOLAR DISTILLER

(75) Inventors: Ahmed Al-Garni, Dhahran (SA); Ayman Kassem, Dhahran (SA); Farooq Saeed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 1019 days.

(21) Appl. No.: 11/536,376

(22) Filed: Sep. 28, 2006

(65) Prior Publication Data

US 2008/0078670 A1    Apr. 3, 2008

(51) Int. Cl.
*B01D 3/02* (2006.01)
*B01D 3/42* (2006.01)

(52) U.S. Cl. .................. 202/234; 159/44; 159/903; 159/DIG. 15; 202/181; 202/185.3; 202/196; 202/267.1; 203/1; 203/10; 203/86; 203/100; 203/DIG. 1

(58) Field of Classification Search .............. 159/44, 159/903, DIG. 15; 202/181, 185.3, 196, 202/234, 267.1; 203/1, 10, 86, 100, DIG. 1
See application file for complete search history.

(56) References Cited

U.S. PATENT DOCUMENTS 3,290,230 A * 12/1966 Kobayashi ............ 202/234
3,336,206 A * 8/1967 Sasaki et al. ............ 202/234
4,940,134 A * 7/1990 Aoki et al. ............ 202/202
6,494,995 B1 * 12/2002 Battah ............ 202/234

FOREIGN PATENT DOCUMENTS

| DE | 10044344 | * 3/2002 |
| GB | 2345002 | * 6/2000 |
| WO | 2005095721 | * 10/2005 |

* cited by examiner

Primary Examiner—Virginia Manoharan
(74) Attorney, Agent, or Firm—Lowe Hauptman Ham & Berner, LLP

(57) ABSTRACT

A solar still includes a relatively shallow chamber with a pyramid shaped transparent cover and a transparent base. The still also includes a pair of rollers and an endless heat absorbing belt rotatable about the rollers. The still is positioned to receive solar energy passing through the transparent cover and impinging on an upper surface of the heat absorbing belt in order to vaporize seawater within the chamber. The efficiency of the still is increased by one or more mirrors disposed below the still for reflecting sun light up through the transparent base to impinge on a lower outer surface of the belt to enhance the vaporization of the seawater. One or more fans are also provided for cooling the cover to enhance the condensation of water that will then run down the cover and into a pure water receptacle.

3 Claims, 6 Drawing Sheets

DOUBLE ACTION SOLAR DISTILLER

FIELD OF THE INVENTION

This invention relates to a solar still and more particularly to a double-action solar still for producing drinking and irrigation water form brackish or contaminated water using solar energy.

BACKGROUND FOR THE INVENTION

Solar stills for converting brackish water to fresh water by evaporating seawater to condensate that is free of salt and other contaminates are well known. However, such apparatus and methods incorporating the evaporation and condensation principles have not been entirely satisfactory in regard to the cost per gallon of fresh water. This has been particularly so with regard to systems using solar energy. Such systems generally use relatively expensive apparatus having relatively low efficiencies and producing relatively small amounts of fresh water.

A United States patent of Gerber, U.S. Pat. No. 3,257,291 represents one attempt to overcome the aforementioned problems. As disclosed therein, a desalination process and system utilize solar energy as a source of heat for effecting evaporation of the seawater and cool seawater or another natural heat sink for condensing the vapor formed in the evaporation process. As alleged, the system requires only minor amounts of power for pumping so that the operating cost per gallon of fresh water is reduced.

Another approach to desalinating water is disclosed in a U.S. Pat. No. 4,343,683 of Diggs. The Diggs patent removes contaminates from water by flowing contaminated water across a grid and into a storage tank. The grid uses solar energy to heat the water to a pre-selected temperature. A dome shaped heat transfer structure receives water from the storage tank and a pre-heater using solar energy heats the water to a further pre-selected temperature. An evaporator receives the heated water and exposes it to a vacuum so that the temperature of the water is above the saturation temperature. The water is vaporized and contaminates such as salt are separated from the water. Contaminates are deposited on a plurality of moving belts and are moved to a solids recovery system.

A more recent approach to solar distillation to provide hot or cold water for irrigation in drinking is disclosed in a U.S. Pat. No. 6,797,124 of Ludwig. The Ludwig patent employs anthracite coal as a heat-absorbing medium. A Greenhouse type roof rest over a gutter that is isolated from a water holding container to prevent deposit formation and algae growth from reaching the gutter. Bacterial growth is inhibited by ventilation and the use of titanium-laden magnetite mixed with the anthracite particles. The gutter is also isolated from the exterior of the unit, which prevents contamination from outside sources. Further, the exterior side of the roof element resting on the gutter is fitted with a metal skirt that provides a heat sink preventing the re-evaporation of condensation flowing toward the gutter.

Notwithstanding the above, it is presently believed that there is a need and a potential market for an improved solar still according to the present invention. There should be a market for such systems because they are environmentally friendly and overcome many of the disadvantages of the prior art. Systems in accordance with the present invention also provide an improved, relatively simple and environmentally friendly saline water distillation for providing potable water for drinking and irrigation in reasonably large amounts. It is also presently believed that the unit can be produced and operated at a reasonable cost, is durable and relatively easy to install and repair. The solar still in accordance with the present invention has what is believed to be a minimal number of moving parts as for example an endless heat absorbing belt which is moved around a pair of rollers at a relatively slow speed.

BRIEF SUMMARY OF THE INVENTION

In essence, the present invention contemplates a solar still including a relatively shallow chamber having a transparent base and a relatively low side wall surrounding the base for confining a mass of brackish or contaminated water. In a preferred embodiment of the invention the base defines a square with four sides. Means such as a pair of valves are also provided for maintaining the lever of brackish or contaminated water at a pre-selected level. A liquid float may also be included to control the valves to maintain the pre-selected level of water in the chamber. The valves may also be used to remove brackish water if the salt or contaminate concentration reaches an unacceptable level. An inclined transparent cover preferably a pyramid shaped cover is disposed above the level of contaminated water and a receptacle for distilled water is provided at the base of the cover, for example, at the base of each side of the pyramid outwardly from the chamber. A pair of rollers and a heat absorbing or black belt having an upper outer surface and a lower outer surface are disposed in the chamber around the rollers with the upper outer surface close to the surface of the brackish or contaminated water. The still is designed and positioned so that solar energy passes through the cover and is directed onto the upper outer surface of the heat absorbing endless belt to heat the belt and the relatively thin layer of water on the belt to cause evaporation of the water. Means such as a solar powered electric motor rotate the endless belt in a conventional manner. An important feature of the present invention resides in the use of reflecting means disposed below the chamber for reflecting solar energy up through the transparent base and onto the outer lower side of the endless belt to heat the belt and raise the temperature of the water to aid in evaporation. The evaporated water then condenses on the cover and flows down into the receptacle for the distillate.

A further embodiment of the invention relates to a double-sided single basin solar still with box shaped basin having a square transparent glass bottom and four sides for receiving or containing a mass of seawater or the like. The still also includes a transparent pyramid shaped cover with four triangular shaped sloping sides and a receptacle for receiving distilled water disposed at a base of the pyramid outside of the basin and along each side of the pyramid. A pair of rollers and an endless heat-absorbing "black" belt is disposed around the rollers with an upper outer surface and a lower outer surface is disposed in said box shape within said box shaped basin with a thin film of seawater on the upper outer surface. Means are also provided for rotating the endless belt so that solar energy passing through the pyramid shaped cover impinges on the upper outer surface of the belt to heat the belt and evaporate water. The still also includes a reflector disposed below the basin for reflecting solar energy up through the transparent glass bottom to impinge on the lower outer surface of the endless belt. This further heats the endless belt and the seawater so that evaporated water will condense on an inner surface of the pyramid shaped cover and run down the sides of the pyramid shaped cover and into the receptacle for pure water.

The invention will now be described in connection with the accompanying drawings wherein like reference numerals have been used to indicate like parts.

DESCRIPTION OF THE PREFERRED EMBODIMENTS OF THE INVENTION

Figure 1:
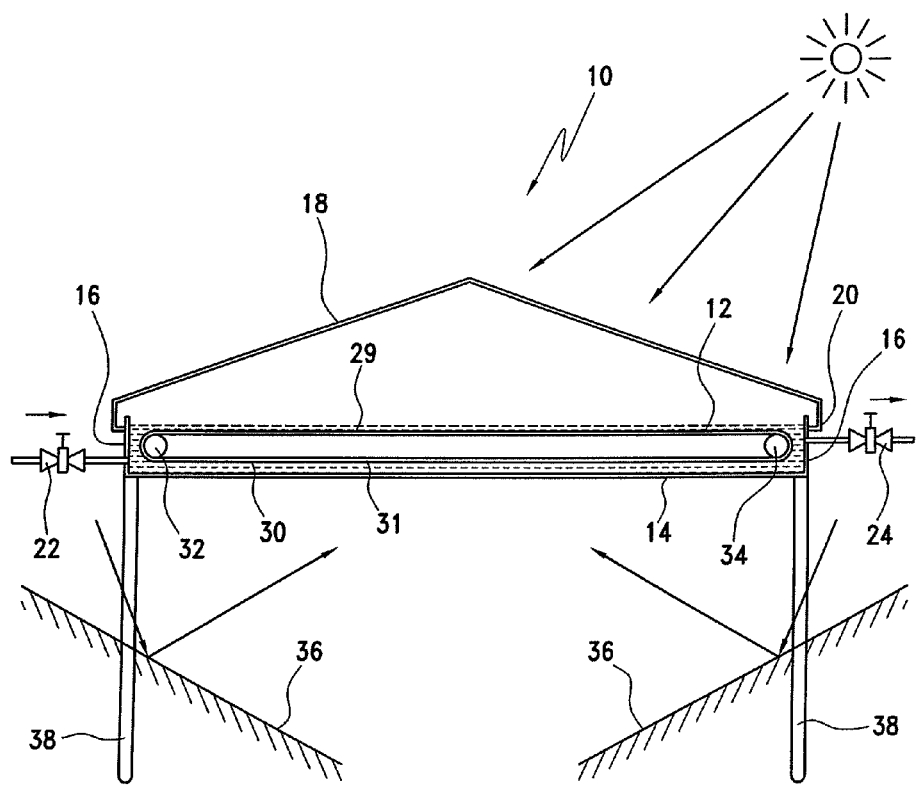
FIG. 1 is a side view of a solar still in accordance with a first embodiment of the invention.

A solar still in accordance with a first embodiment of the invention is shown if FIG. 1. As shown, the still 10 includes a box-like relatively shallow chamber 12 having a square transparent base 14 of glass or the like. The transparent base 14 is preferably clear in order to allow a maximum amount of solar energy to pass through the base. The relatively shallow chamber 12 also includes four sidewalls 16 which are sealed to the base to provide a water tight chamber with an open top and a height which is preferably less than about one-tenth of the width and more preferably about one-twelfth of its width. A pyramid shaped cover 18 is placed over the chamber 12 with its base extending outwardly beyond the walls 16 of the chamber 12.

The pyramid shaped cover 18 also defines a relatively shallow shape with four triangular shape sloping sides and with its height less than about one-sixth of the width of the chamber 12. The height of the pyramid shape cover 18 is a compromise of wanting an inclined cover as close to the level of seawater or contaminated water as possible and yet with a sufficient slope that condensate will flow down the cover and into a receptacle 20.

An inlet valve 22 is provided for feeding brackish or contaminated water into the chamber 12 while an outlet valve 24 removes excess water that would exceed a pre-selected level in the chamber. The outlet valve 24 may remain open if positioned at the pre-selected water level or opened in response to a float-valve assembly (not shown) in a conventional manner to maintain the level of the water at the pre-selected level.

An endless heat absorbing belt 30 is disposed in the chamber 12 below the surface of the water for distillation. The heat absorbing or "black" belt 30 is disposed around rollers 32 or 34 for rotation around the rollers with a thin film or layer of water on an upper outer surface 29. Solar rays passing through the pyramid shaped transparent cover 18 pass through the cover 18 and heat the belt 30 to aid in the evaporation of water on the upper outer surface 29 of the belt 30.

In order to increase the effectiveness and efficiency of the still 10, reflecting means such as a plurality of mirrors 36 are disposed below the level of the chamber 12 and positioned to reflect the suns rays up through the transparent base 14 to impinge on the lower outer surface 31 of the belt 30. The reflecting rays aid in raising the temperature of the heat absorbing belt 30 which will in turn aid in the evaporation process. Means, such as a plurality of legs 38 support the still 10 above the level of the mirror 36.

Figures 2, 3:
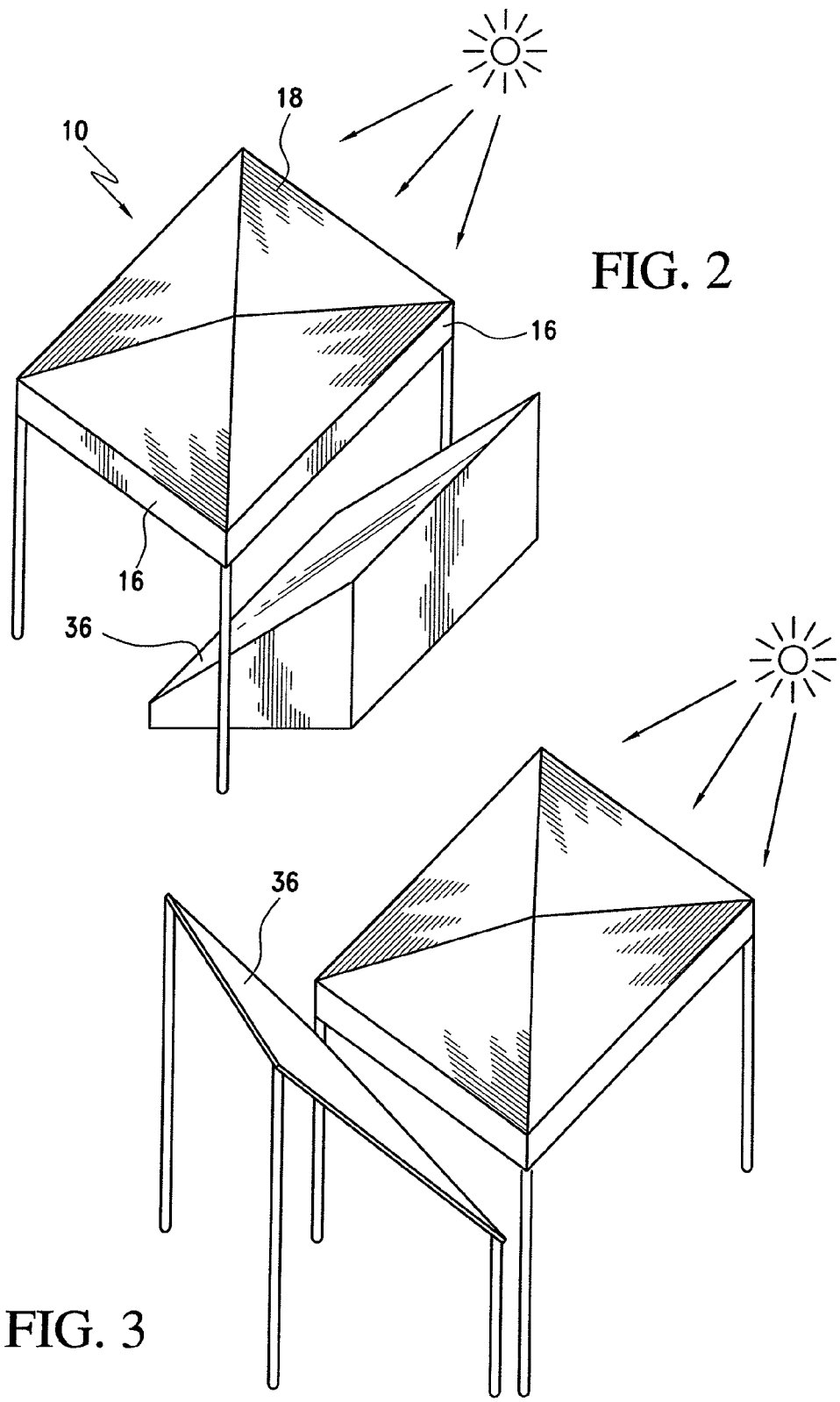
FIG. 2 is a perspective view illustrating a portion of a solar still in accordance with the invention.
FIG. 3 is a perspective view showing a further embodiment of the invention.

FIG. 2 is a perspective view illustrating the positioning of the mirror surface 36 below the chamber 12 (FIG. 1). The mirror surface 36 is preferably moveable in order to reflect the maximum solar energy through the transparent base 14 depending on the time of year and/or the time of day. An alternative embodiment shown in FIG. 3 illustrates the use of a mirror 11 to reflect the rays of the sun through one side of the pyramid shaped cover 18. It should be recognized that upper and lower mirrors may be used to reflect the maximum amount of solar energy onto the belt 30 (FIG. 1).

Figure 4A:
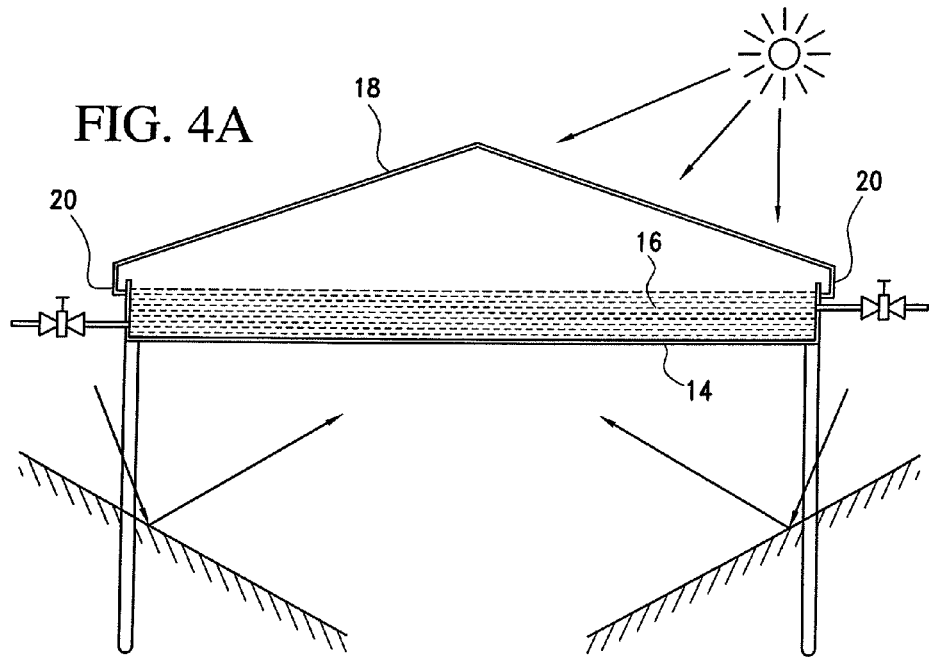
FIG. 4A is a side elevation view of a solar still in accordance with the invention.
Figure 4B:
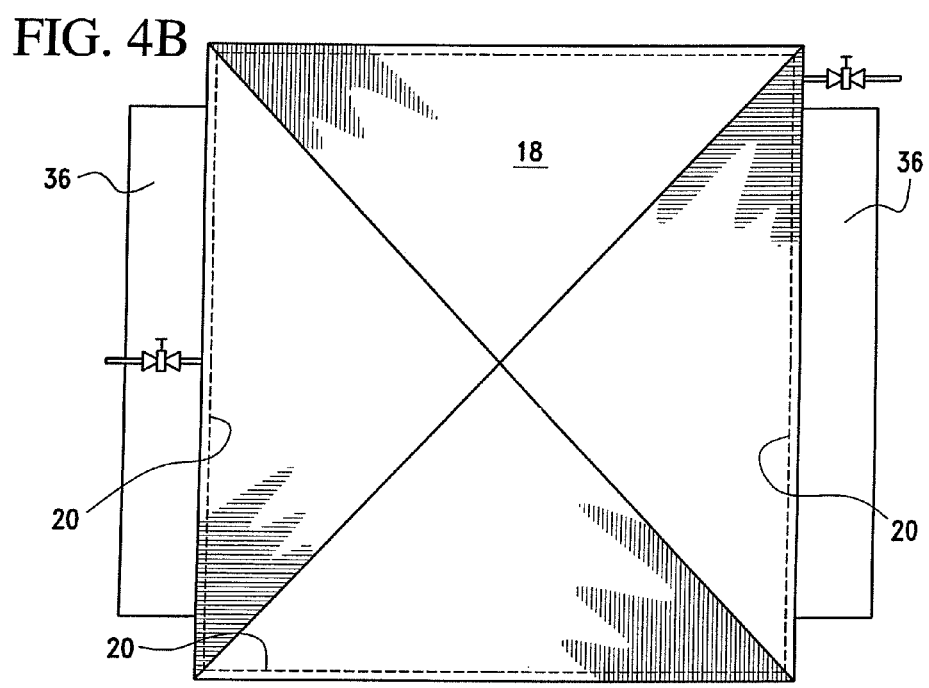
FIG. 4B is a top view of the solar still shown in FIG. 4A.

As shown in FIGS. 4A and 4B, a pair of mirrors 36 are positioned under two sides of the solar still 10 and adapted to reflect the solar rays thorough the base 14 as described above. An additional third and perhaps a fourth mirror can be added below the still 10 in order to reflect the maximum amount of solar energy onto the belt 30.

As shown in dotted lines in FIG. 4B, the receptacle 20 for receiving distilled water extends around the outer periphery at the bottom of each of the sides of the pyramid shaped cover 18.

Figure 5:
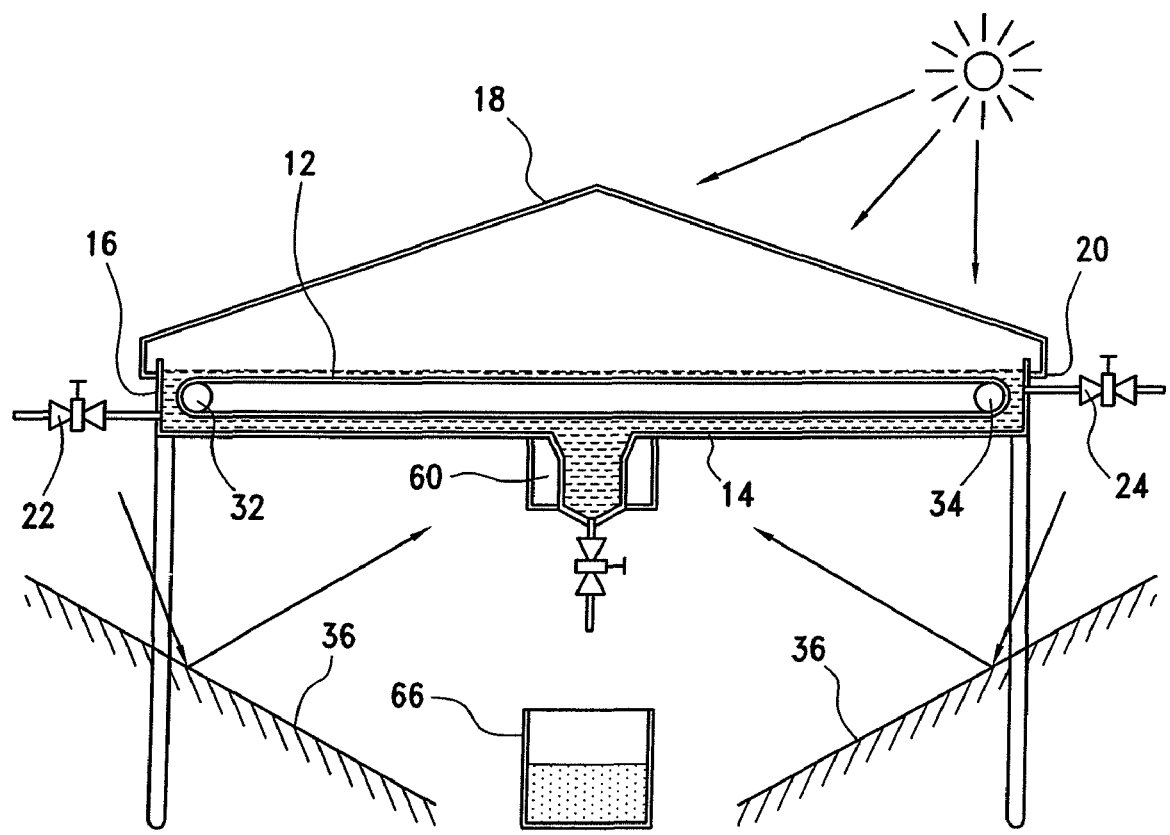
FIG. 5 is a side view illustrating another embodiment of the invention.

FIG. 5 is a side view of a further embodiment of the invention but includes a separate brine collecting chamber 60 and valve 62 for removing concentrated brine from the still. As shown the brine is dropped into a tank 64 or other suitable container.

Figure 6:
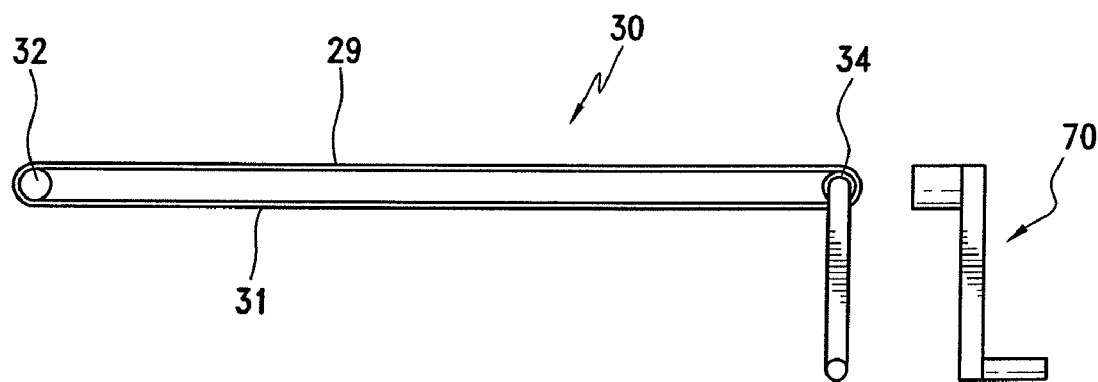
FIG. 6 is a schematic illustration of the roller assembly and endless belt with means for rotating the endless belt.
Figure 6:
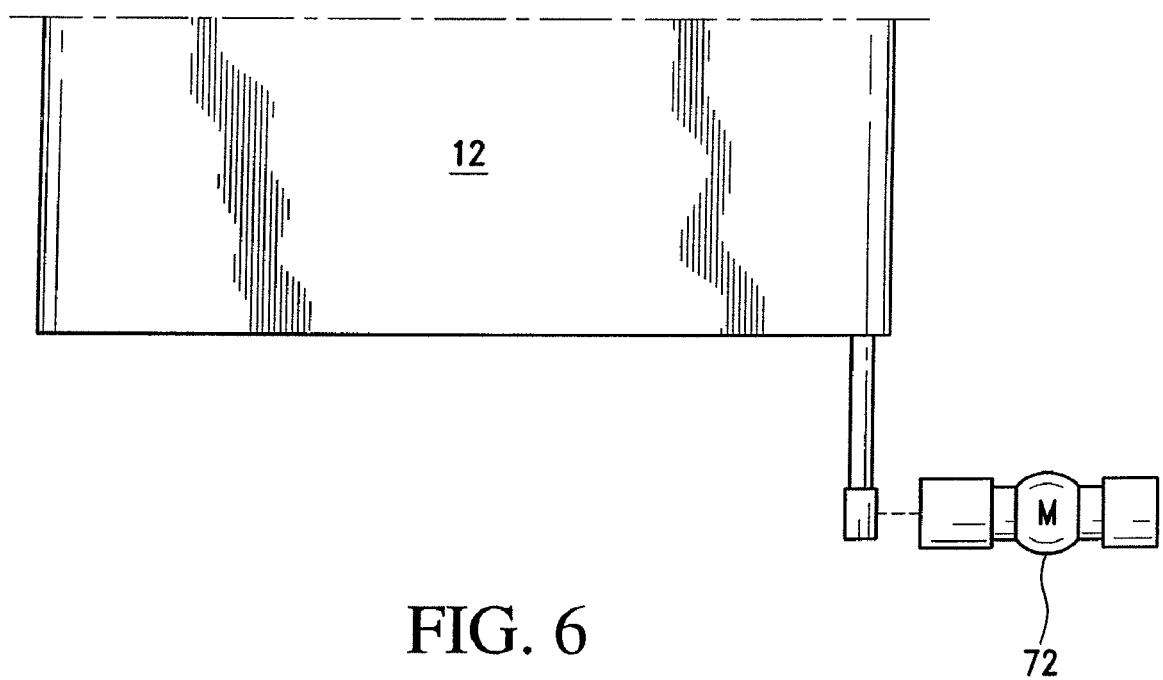

FIG. 6 is a schematic illustration of the chamber 12, heat absorbing or "black belt" 30 having an upper outer surface 29 and a lower outer surface 31 disposed about the rollers 32 and 34. Means such as a hand crank 70 or motor 72 for rotate one of the rollers 34 to thereby drive the belt. The motor 72 would be powered by a solar cell 73 and include a gear assembly 75 and drive shaft 76 for rotating the belt 30 at a pre-selected speed.

Figure 7A:
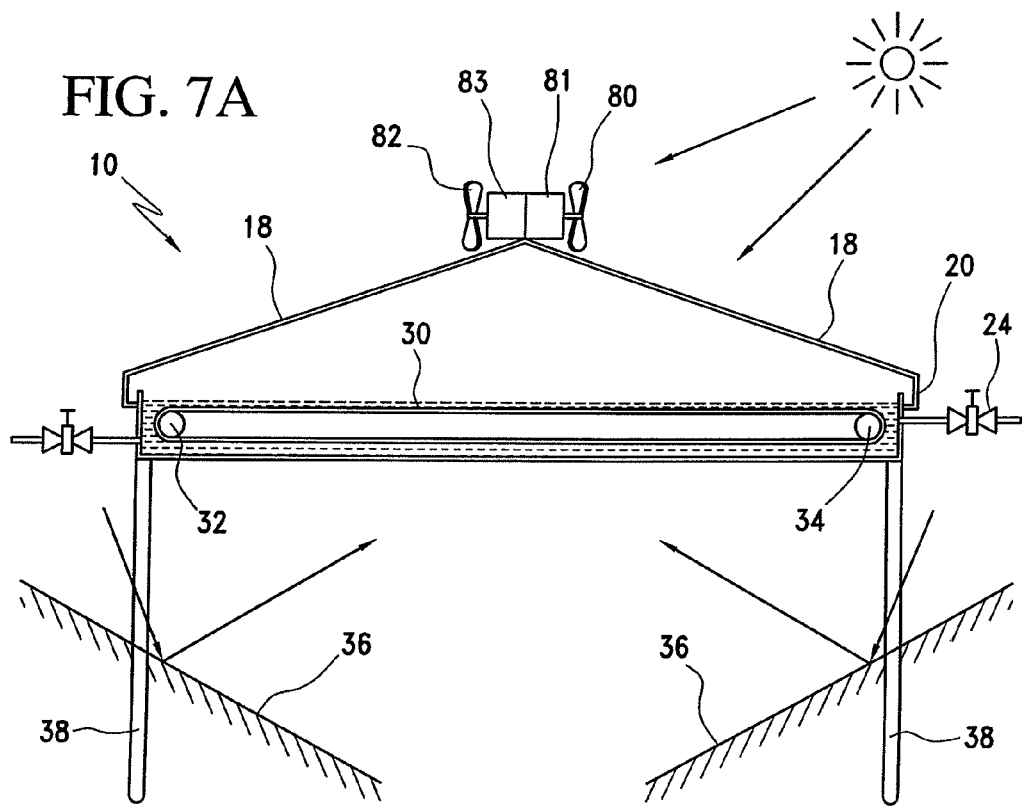
FIG. 7A is a side view of a solar still in accordance with a further embodiment of the invention.

A further embodiment of the invention will now be described with reference to FIGS. 7A, 7B and 7C. This embodiment of the invention is generally similar to the first embodiment shown in FIG. 1 but includes a pair of solar powered fans 80 and 82. The fans 80 and 82 are powered by solar cells 81 and 83 for cooling the pyramid shaped cover 18. Two such fans are shown but in practice one fan is provided for each side of the pyramid cover 18.

Figure 7B:
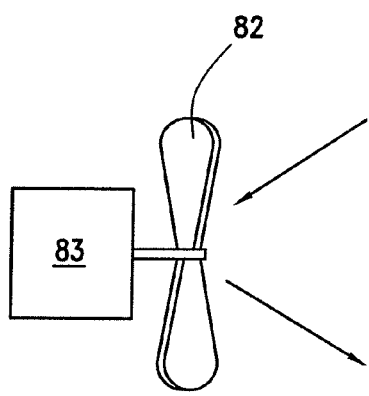
FIG. 7B is a side view of a fan as used in the further embodiment of the invention.
Figure 7C:
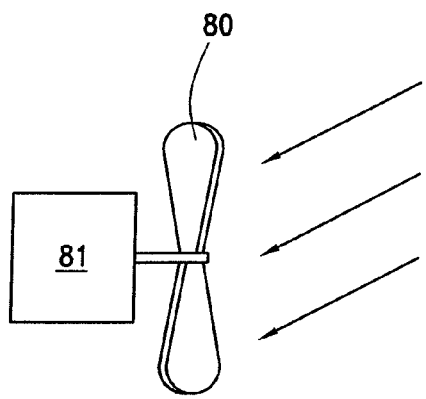
FIG. 7C is a side elevational view of a different fan as used in the further embodiment of the invention.

As shown in FIG. 7B the fan blades may be reflective in order to reflect more of the suns rays onto the belt 30. It is also contemplated that the direct rays of the sun can be focused by the fan blades as illustrated in FIG. 7C to increase the heat of the water in the chamber.

While the invention has been described in connection with its preferred embodiments, it should be recognized that changes and modifications may be made therein without departing from the scope of the claims.

What is claimed is:

1. A solar still comprising:
   a chamber having a transparent base and a side wall surrounding said base for confining a mass of water at a pre-selected level in said chamber and means for adding and removing water from said chamber;
   an inclined transparent cover comprising a glass plate, a distilled water receptacle and a base of said cover, said inclined cover receiving solar energy impinging thereon and passing there through and extending outwardly beyond said chamber so that distillate flows down said cover and falls outside of said chamber and into said receptacle;

a pair of rollers and an endless heat absorbing belt having an upper and lower outer surfaces passing around said rollers in said chamber below the level of water and means including a solar powered motor for rotating said heat absorbing belt so that solar energy passes through said inclined transparent cover impinging on said upper outer surface of said heat absorbing endless belt to thereby heat said belt;

cooling means including a solar powered fan for cooling the surface of said cover; and reflecting means for reflecting solar energy disposed below said chamber for reflecting solar energy up through said transparent base and onto said lower outer surface of said belt to thereby add heat to said belt whereby water is vaporized by said belt and condenses on said inclined cover and flows down into said receptacle.

2. A solar still comprising:

a chamber having a square transparent base and four side walls surrounding said base for confining a mass of water at a pre-selected level within said chamber and means for adding and removing contaminated water from said chamber;

a pyramid shaped cover having a width and disposed above the level of contaminated water and a distilled water receptacle on each side of said cover at a base thereof and said cover receiving the rays of the sun;

a pair of rollers and a heat absorbing endless belt having an upper outer surface and a lower outer surface passing around said rollers in said chamber below the level of water and means for rotating said heat absorbing belt so that solar energy passing through said pyramid shaped transparent cover impinges on said upper outer surface of said heat absorbing endless belt to thereby heat said belt;

reflecting means including a mirror for reflecting solar energy disposed below said chamber and reflecting solar energy up through said square transparent base and onto said lower outer surface of said heat absorbing belt to add heat to said belt so that water vapor from said water heated by said belt condenses on said pyramid shaped cover and flows down into said receptacle; and in which said reflecting means includes multiple mirror surfaces, cooling means including a plurality of solar powered fans for cooling said pyramid shaped cover; and additional reflecting means for directing solar rays through said pyramid shaped cover and onto an upper outer surface of said heat absorbing belt.

3. A double-sided single basin solar still comprising:

a boxed shaped basin having a width and a square transparent glass bottom and four sides for receiving a mass of contaminated water;

a transparent pyramid shaped cover having four sloping sides and a receptacle for receiving distillate disposed at a bottom of said pyramid shaped cover outside of said basin;

said box shaped basin has a height of less than one fifth of said width of said basin and said pyramid shaped cover has a height of about one sixteenth of said width;

cooling means including a plurality of solar powered fans for cooling said pyramid shaped cover;

a pair of rollers at an endless heat absorbing belt disposed around said rollers with an upper outer surface and a lower outer surface disposed in said box shaped basin with a thin film of contaminated water on said upper outer surface and means including a solar powered motor for rotating said endless belt so that solar energy passing through said pyramid shaped cover impinges on an upper outer surface of said belt to heat said belt and evaporate water; and reflecting means including a plurality of mirrors disposed below said basin for reflecting solar energy up through said transparent glass bottom to impinge on said lower outer surface of said endless belt to heat the contaminated water whereby evaporated water will condense on an inner surface of said pyramid shaped cover and run down said sides of said pyramid shaped cover and into said receptacle;

a first valve for providing a mass of contaminated water to said basin and second means for removing water from said basin; and means for maintaining a pre-selected level of water in said basin.

\* \* \* \* \*